United States Patent
Hu

(10) Patent No.: US 7,664,941 B2
(45) Date of Patent: Feb. 16, 2010

(54) BRANCH PREDICTION METHODS AND DEVICES CAPABLE OF PREDICTING FIRST TAKEN BRANCH INSTRUCTION WITHIN PLURALITY OF FETCHED INSTRUCTIONS

(75) Inventor: Yao-Chung Hu, Tainan County (TW)

(73) Assignee: Faraday Technology Corp., Hsin-Chu (TW)

( * ) Notice: Subject to any disclaimer, the term of this patent is extended or adjusted under 35 U.S.C. 154(b) by 302 days.

(21) Appl. No.: 11/769,712

(22) Filed: Jun. 28, 2007

(65) Prior Publication Data

US 2009/0006826 A1 Jan. 1, 2009

(51) Int. Cl.
*G06F 9/32* (2006.01)
(52) U.S. Cl. ...................................... 712/239
(58) Field of Classification Search ............... None
See application file for complete search history.

(56) References Cited

U.S. PATENT DOCUMENTS

| | | | | |
|---|---|---|---|---|
| 5,574,871 A * | 11/1996 | Hoyt et al. | ............... | 712/200 |
| 5,842,008 A * | 11/1998 | Gochman et al. | ........... | 712/240 |
| 6,237,077 B1 * | 5/2001 | Sharangpani et al. | ......... | 712/24 |
| 6,304,960 B1 * | 10/2001 | Yeh et al. | ................. | 712/236 |
| 6,351,796 B1 * | 2/2002 | McCormick et al. | ........ | 711/204 |
| 6,721,875 B1 * | 4/2004 | McCormick et al. | ........ | 712/233 |

* cited by examiner

*Primary Examiner*—Eric Coleman
(74) *Attorney, Agent, or Firm*—Winston Hsu

(57) ABSTRACT

A branch prediction method, capable of predicting a first taken branch instruction within a plurality of fetched instructions, includes: determining whether one of the fetched instructions is the first taken branch instruction to be predicted according to hint instruction(s) or according to latest statistics of whether respective fetched instructions have been taken. The branch prediction method further includes: if one of the fetched instructions is determined to be the first taken branch instruction, performing branch prediction on the first taken branch instruction.

24 Claims, 3 Drawing Sheets

US 7,664,941 B2

BRANCH PREDICTION METHODS AND DEVICES CAPABLE OF PREDICTING FIRST TAKEN BRANCH INSTRUCTION WITHIN PLURALITY OF FETCHED INSTRUCTIONS

BACKGROUND

1. Field of the Invention

The present invention relates to branch prediction of central processing units (CPUs), and more particularly, to branch prediction methods and devices capable of predicting a first taken branch instruction within a plurality of fetched instructions.

2. Description of the Prior Art

FIG. 1 illustrates a branch prediction mechanism 100 utilized in a conventional single-issue processor that fetches only one instruction per clock cycle, where a portion of a program counter (PC) PC0 is utilized for indexing an entry in a branch target buffer (BTB) 110, so a branch predictor 120 performs branch prediction according to the entry's elements Tag0, Hist0, and TA0 outputted from the BTB 110, in order to predict the next PC.

FIG. 2 illustrates a branch prediction mechanism 200 utilized in a conventional multi-issue processor that fetches multiple instructions per clock cycle, where a portion of each PC (e.g. PC0, PC1, PC2, and PC3) is utilized for indexing an entry in a BTB 210. In the combinational module 220 shown in FIG. 2, four comparison and directional prediction circuits (CDPCs) 222-0, 222-1, 222-2, and 222-3, which are four copies of a set of comparator 122 and direction predictor 124, are required for performing branch prediction according to four sets of elements (Tag0, Hist0, TA0), (Tag1, Hist1, TA1), (Tag2, Hist2, TA2), and (Tag3, Hist3, TA3) of four entries corresponding to the PCs PC0, PC1, PC2, and PC3, respectively. In addition, complicated architecture such as a logic circuit 226 and a control circuit (not shown) of the BTB 210 should be properly designed to predict a first taken branch instruction, so as to predict the next PC. As a result, material and design costs of the branch prediction mechanism 200 are significantly high, and the overall chip area required for implementing the multi-issue processor is quite large.

SUMMARY OF THE INVENTION

It is therefore an objective of the claimed invention to provide branch prediction methods and devices capable of predicting a first taken branch instruction within a plurality of fetched instructions.

It is another objective of the claimed invention to provide branch prediction methods and devices capable of predicting a first taken branch instruction within a plurality of fetched instructions, in order to perform branch prediction on at most one fetched instruction in the same clock cycle, so as to reduce the hardware complexity.

According to one embodiment of the claimed invention, a branch prediction method capable of predicting a first taken branch instruction within a plurality of fetched instructions is disclosed. The branch prediction method comprises: determining whether one of the fetched instructions is the first taken branch instruction to be predicted according to hint instruction(s) or according to the latest statistics of whether respective fetched instructions have been taken; and if one of the fetched instructions is determined to be the first taken branch instruction, performing branch prediction on the first taken branch instruction.

According to one embodiment of the claimed invention, a branch prediction device capable of predicting a first taken branch instruction within a plurality of fetched instructions is disclosed. The branch prediction device comprises: a first taken branch instruction predictor for determining whether one of the fetched instructions is the first taken branch instruction to be predicted according to hint instruction(s) or according to the latest statistics of whether respective fetched instructions have been taken; and a single prediction logic module, coupled to the first taken branch instruction predictor, for performing branch prediction on at most one fetched instruction in the same clock cycle. If the first taken branch instruction predictor determines one of the fetched instructions to be the first taken branch instruction, the single prediction logic module performs branch prediction on the first taken branch instruction.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
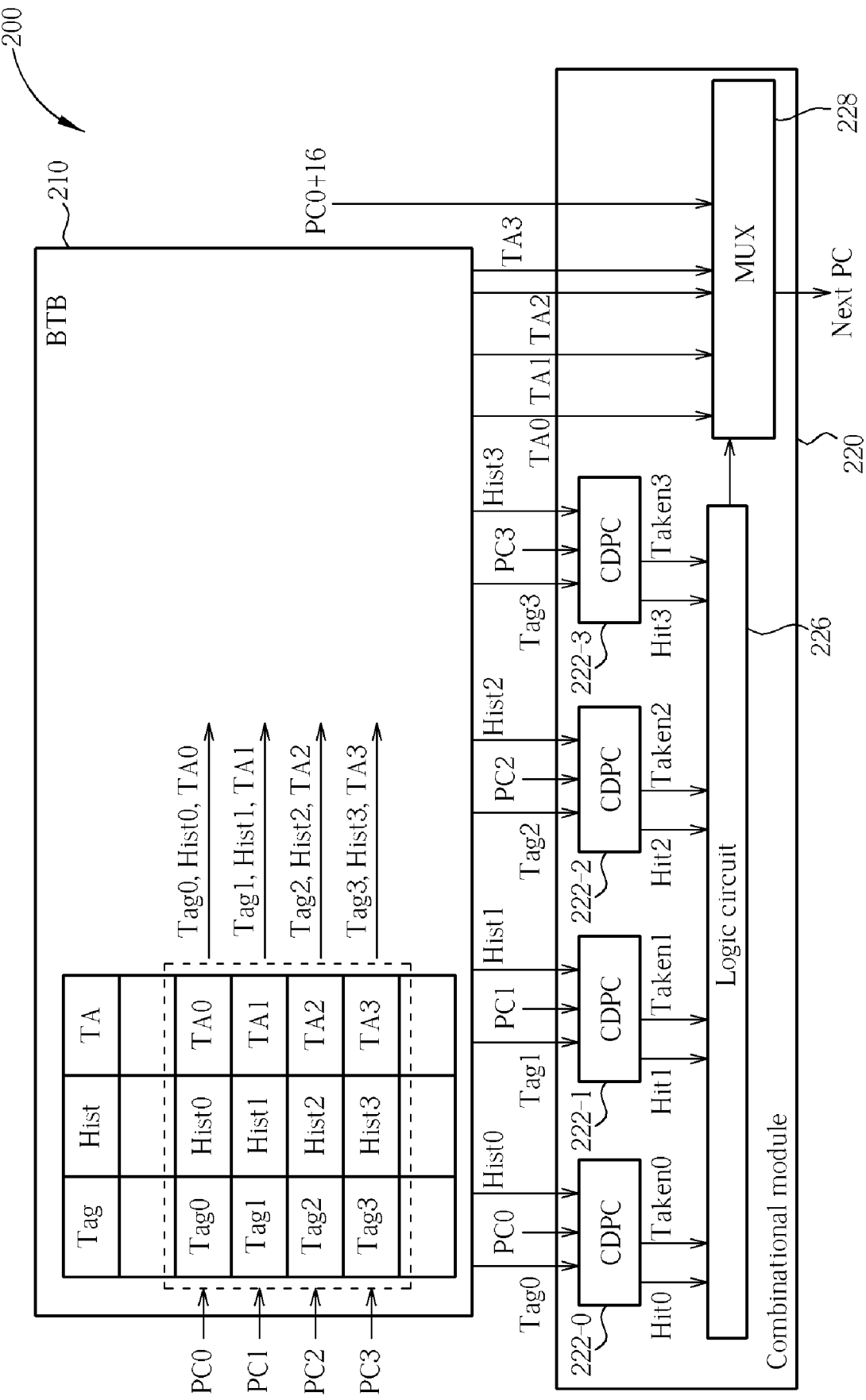
FIG. 2 illustrates a branch prediction mechanism utilized in a conventional multi-issue processor according to the prior art.
Figure 3:
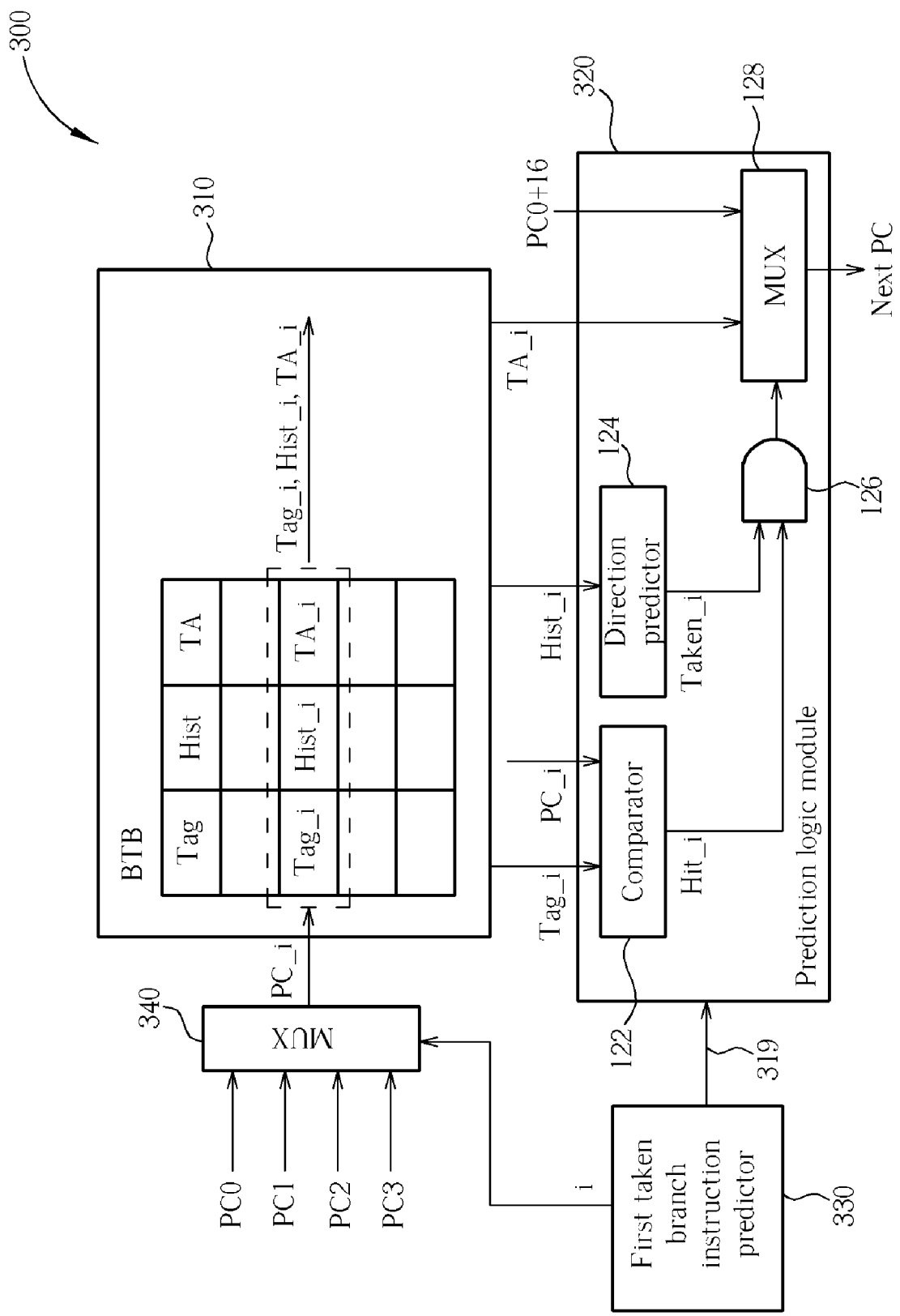
FIG. 3 is a diagram of a branch prediction device according to one embodiment of the present invention.

Please refer to FIG. 3. FIG. 3 is a diagram of a branch prediction device 300 capable of predicting a first taken branch instruction within a plurality of fetched instructions according to one embodiment of the present invention. In this embodiment, the fetched instructions comprise four instructions 10, 11, 12, and 13, and the program counters (PCs) PC0, PC1, PC2, and PC3 of the instructions 10, 11, 12, and 13 are illustrated. Notations such as Tag_i, Hist_i, TA_i, Hit_i, and Taken_i are respectively utilized for representing the corresponding notations shown in FIG. 2 in accordance with PC_i corresponding to an index i shown in FIG. 3.

Figure 1:
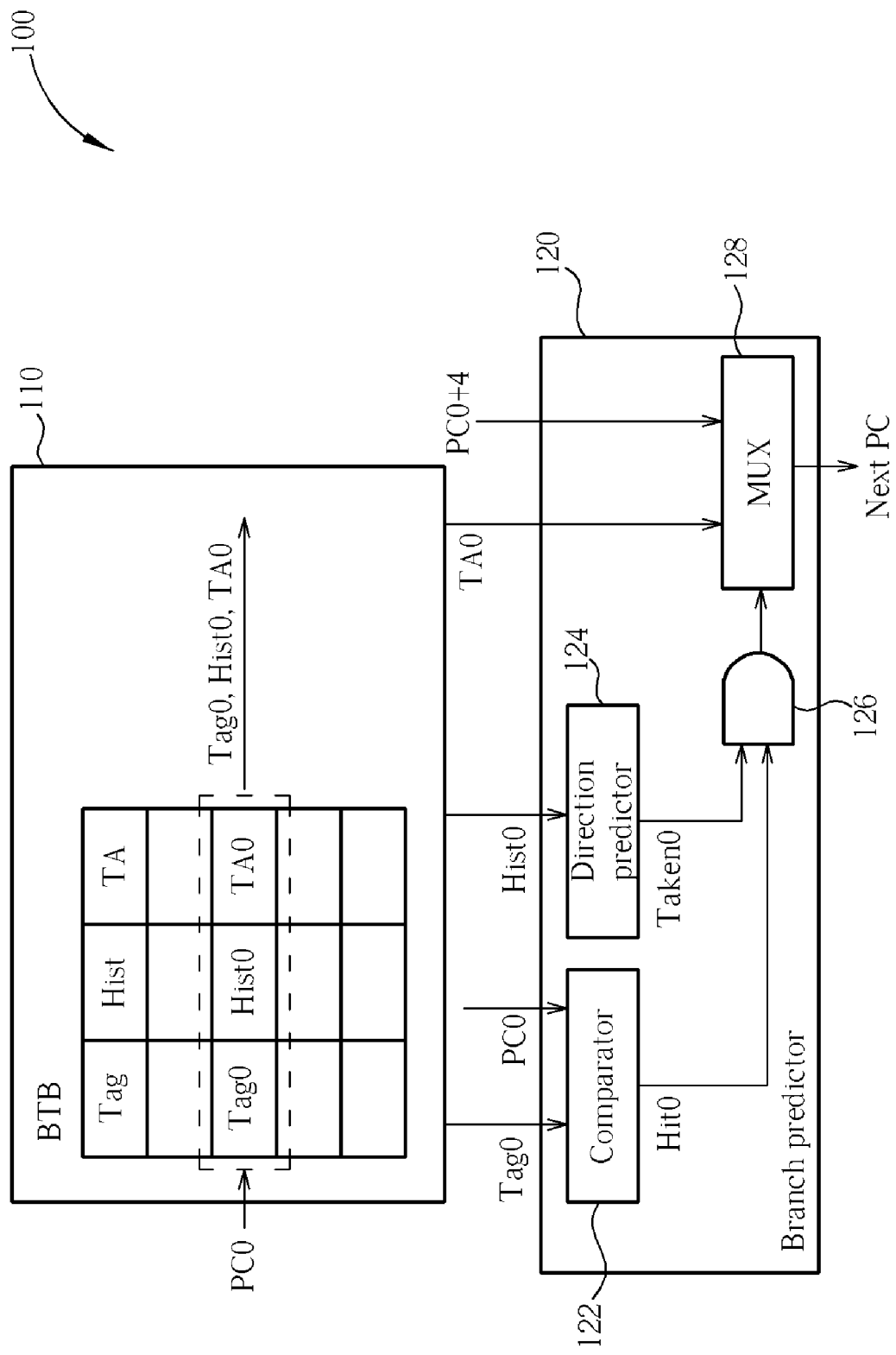
FIG. 1 illustrates a branch prediction mechanism utilized in a conventional single-issue processor according to the prior art.

The branch prediction device 300 of this embodiment comprises a branch target buffer (BTB) 310 similar to the BTB 110 shown in FIG. 1, and further comprises a single prediction logic module 320 comprising at least one control terminal 319. The prediction logic module 320 of this embodiment comprises a single set of the comparator 122 and the direction predictor 124, and further comprises the AND gate 126 and the multiplexer 128, where these components are shown in FIG. 1. Please note that the architecture shown in FIG. 3 is designed for a multi-issue processor (not shown) where the branch prediction device 300 is positioned, and the control terminal 319 can be utilized for enabling/disabling at least a portion of the components in the prediction logic module 320.

In addition, the branch prediction device 300 of this embodiment further comprises a first taken branch instruction predictor 330 and a multiplexer 340. According to this embodiment, the first taken branch instruction predictor 330 determines whether one of the fetched instructions is the first taken branch instruction to be predicted according to the latest statistics of whether respective fetched instructions have been taken. As a result, the multiplexer 340 may output the PC PC_i corresponding to the index i outputted from the first taken branch instruction predictor 330, which means the multiplexer 340 is capable of selecting one of the fetched instructions according to the prediction performed by the first taken branch instruction predictor 330.

In this embodiment, the BTB 310 is utilized for providing an entry corresponding to one of the fetched instructions (e.g. the entry comprising the elements Tag_i, Hist_i, and TA_i) according to the prediction performed by the first taken branch instruction predictor 330. If the first taken branch instruction predictor 330 determines one of the fetched instructions to be the first taken branch instruction so that the multiplexer 340 outputs the PC PC_i corresponding to the index i as shown in FIG. 3, the prediction logic module 320 performs branch prediction according to the entry corresponding to the first taken branch instruction, i.e. the entry comprising the elements Tag_i, Hist_i, and TA_i.

In addition, the prediction logic module 320 is utilized for performing branch prediction on at most one fetched instruction in the same clock cycle. If the first taken branch instruction predictor 330 determines one of the fetched instructions to be the first taken branch instruction, the prediction logic module 320 performs branch prediction on the first taken branch instruction. For example, if the fetched instructions comprise two branch instructions b1 and b2, the first taken branch instruction predictor 330 determines whether the branch instruction b1 or the branch instruction b2 is the first taken branch instruction to be predicted according to the latest statistics of whether the branch instruction b1 and the branch instruction b2 have been taken, respectively. More specifically, for each fetched instruction, the branch prediction device 300 of this embodiment utilizes a history parameter of the fetched instruction (e.g. the history parameter Hist_i of the instruction corresponding to the PC PC_i) to perform the statistics of whether the fetched instruction has been taken, where the history parameter corresponds to the taken/non-taken history of the fetched instruction.

According to the history parameters corresponding to the two branch instructions b1 and b2, if both the branch instructions b1 and b2 seem to be the first taken branch instruction, and if the branch instruction b1 is prior to the branch instruction b2 in an instruction sequence of the multi-issue processor mentioned above, the first taken branch instruction predictor 330 determines the branch instruction b1 to be the first taken branch instruction, which typically results in a better prediction result.

Please note that the first taken branch instruction predictor 330 may utilize the control terminal 319 to disable operations of at least one portion of the prediction logic module 320. For example, if the fetched instructions comprise no branch instruction, the first taken branch instruction predictor 330 of this embodiment may control the prediction logic module 320 to not perform branch prediction. According to this embodiment, if none of the fetched instructions is determined to be the first taken branch instruction, the first taken branch instruction predictor 330 may also control the prediction logic module 320 to not perform branch prediction.

According to a variation of this embodiment, if none of the fetched instructions is determined to be the first taken branch instruction, and if the fetched instructions comprise only one branch instruction (for example, the branch instruction b1 mentioned above), the first taken branch instruction predictor 330 of this variation may determine the branch instruction b1 to be the first taken branch instruction.

According to yet another variation of this embodiment, if none of the fetched instructions is determined to be the first taken branch instruction, and if the fetched instructions comprise a plurality of branch instructions such as the branch instructions b1 and b2, the first taken branch instruction predictor 330 of this variation may arbitrarily determine one branch instruction out of the fetched instructions (e.g. one of the branch instructions b1 and b2) to be the first taken branch instruction.

According to another embodiment, which is also a variation of the embodiment shown in FIG. 3, the first taken branch instruction predictor 330 determines whether one of the fetched instructions is the first taken branch instruction to be predicted according to hint instruction(s). Similar descriptions for this embodiment are not repeated in detail.

According to the embodiment shown in FIG. 3 and different variations such as those disclosed above, the branch prediction methods and devices provided by the present invention are capable of predicting the first taken branch instruction as mentioned. In contrast to the prior art, regarding a multi-issue processor that fetches multiple instructions per clock cycle, material and design costs of branch prediction devices can be greatly reduced according to the present invention since the present invention requires only a single set such as the set of the comparator 122 and the direction predictor 124.

It is another advantage of the present invention that the overall chip area required for implementing the multi-issue processor according to the present invention is considerably decreased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A branch prediction method capable of predicting a first taken branch instruction within a plurality of fetched instructions, the branch prediction method implemented by a computer processor comprising:

determining by the processor whether one of the fetched instructions is the first taken branch instruction to be predicted according to hint instruction(s) or according to latest statistics of whether respective fetched instructions have been taken; and performing by the processor branch prediction on at most one fetched instruction in a same clock cycle, wherein the step of performing branch prediction on at most one fetched instruction in the same clock cycle further comprises:

if one of the fetched instructions is determined to be the first taken branch instruction, performing branch prediction on the first taken branch instruction and excluding at least another one of the plurality of fetched instructions from branch prediction.

2. The branch prediction method of claim 1, wherein the fetched instructions comprise a first branch instruction and a second branch instruction, and the step of determining whether one of the fetched instructions is the first taken branch instruction to be predicted further comprises:

determining whether the first branch instruction or the second branch instruction is the first taken branch instruction to be predicted according to the latest statistics of whether the first branch instruction and the second branch instruction have been taken, respectively.

3. The branch prediction method of claim 2, further comprising:

if both the first branch instruction and the second branch instruction seem to be the first taken branch instruction according to the latest statistics, and if the first branch instruction is prior to the second branch instruction in an instruction sequence, determining the first branch instruction to be the first taken branch instruction and performing branch prediction on the first taken branch instruction.

4. The branch prediction method of claim 1, further comprising:
   if none of the fetched instructions is determined to be the first taken branch instruction, not performing branch prediction.

5. The branch prediction method of claim 1, further comprising:
   if none of the fetched instructions is determined to be the first taken branch instruction, and if the fetched instructions comprise only one branch instruction, determining the branch instruction to be the first taken branch instruction and performing branch prediction on the first taken branch instruction.

6. The branch prediction method of claim 1, further comprising:
   if none of the fetched instructions is determined to be the first taken branch instruction, and if the fetched instructions comprise a plurality of branch instructions, arbitrarily determining one branch instruction out of the fetched instructions to be the first taken branch instruction and performing branch prediction on the first taken branch instruction.

7. The branch prediction method of claim 1, further comprising:
   if the fetched instructions comprise no branch instruction, not performing branch prediction.

8. The branch prediction method of claim 1, further comprising:
   for each fetched instruction, utilizing a history parameter of the fetched instruction to perform the statistics of whether the fetched instruction has been taken, wherein the history parameter corresponds to the taken/non-taken history of the fetched instruction.

9. The branch prediction method of claim 1, wherein the step of performing branch prediction on the first taken branch instruction further comprises:
   not performing branch prediction on any of the other fetched instructions in a same clock cycle.

10. A branch prediction device, implemented in a processor, capable of predicting a first taken branch instruction within a plurality of fetched instructions, the branch prediction device comprising:
    a first taken branch instruction predictor for determining whether one of the fetched instructions is the first taken branch instruction to be predicted according to hint instruction(s) or according to latest statistics of whether respective fetched instructions have been taken; and
    a single prediction logic module, coupled to the first taken branch instruction predictor, for performing branch prediction on at most one fetched instruction in a same clock cycle, wherein the single prediction logic module has logic circuits included therein;
    wherein if the first taken branch instruction predictor determines one of the fetched instructions to be the first taken branch instruction, the single prediction logic module performs branch prediction on the first taken branch instruction and excludes at least another one of the plurality of fetched instructions from branch prediction.

11. The branch prediction device of claim 10, further comprising:
    a multiplexer, coupled between the first taken branch instruction predictor and the single prediction logic module, for selecting one of the fetched instructions according to the prediction performed by the first taken branch instruction predictor.

12. The branch prediction device of claim 10, wherein the fetched instructions comprise a first branch instruction and a second branch instruction, and the first taken branch instruction predictor determines whether the first branch instruction or the second branch instruction is the first taken branch instruction to be predicted according to the latest statistics of whether the first branch instruction and the second branch instruction have been taken, respectively.

13. The branch prediction method of claim 12, wherein if both the first branch instruction and the second branch instruction seem to be the first taken branch instruction, and if the first branch instruction is prior to the second branch instruction in an instruction sequence, the first taken branch instruction predictor determines the first branch instruction to be the first taken branch instruction.

14. The branch prediction device of claim 10, wherein if none of the fetched instructions is determined to be the first taken branch instruction, the first taken branch instruction predictor controls the single prediction logic module to not perform branch prediction.

15. The branch prediction device of claim 10, wherein if none of the fetched instructions is determined to be the first taken branch instruction, and if the fetched instructions comprise only one branch instruction, the first taken branch instruction predictor determines the branch instruction to be the first taken branch instruction.

16. The branch prediction device of claim 10, wherein if none of the fetched instructions is determined to be the first taken branch instruction, and if the fetched instructions comprise a plurality of branch instructions, the first taken branch instruction predictor arbitrarily determines one branch instruction out of the fetched instructions to be the first taken branch instruction.

17. The branch prediction device of claim 10, wherein if the fetched instructions comprise no branch instruction, the first taken branch instruction predictor controls the single prediction logic module to not perform branch prediction.

18. The branch prediction device of claim 10, wherein for each fetched instruction, the branch prediction device utilizes a history parameter of the fetched instruction to perform the statistics of whether the fetched instruction has been taken, wherein the history parameter corresponds to the taken/non-taken history of the fetched instruction.

19. The branch prediction device of claim 10, further comprising:
    a branch target buffer (BIB), coupled between the first taken branch instruction predictor and the single prediction logic module, for providing an entry corresponding to one of the fetched instructions according to the prediction performed by the first taken branch instruction predictor;
    wherein if the first taken branch instruction predictor determines one of the fetched instructions to be the first taken branch instruction, the single prediction logic module performs branch prediction according to an entry corresponding to the first taken branch instruction.

20. The branch prediction device of claim 10, wherein the single prediction logic module comprises a single set of a comparator and a direction predictor.

21. A branch prediction method capable of predicting a first taken branch instruction within a plurality of fetched instructions, the branch prediction method implemented by a computer processor comprising:
    determining by the processor whether one of the fetched instructions is the first taken branch instruction to be predicted according to hint instruction(s) or according to latest statistics of whether respective fetched instructions have been taken;

if one of the fetched instructions is determined to be the first taken branch instruction, performing by the processor branch prediction on the first taken branch instruction; and if none of the fetched instructions is determined to be the first taken branch instruction, and if the fetched instructions comprise only one branch instruction, determining the branch instruction to be the first taken branch instruction and performing by the processor branch prediction on the first taken branch instruction.

22. A branch prediction method capable of predicting a first taken branch instruction within a plurality of fetched instructions, the branch prediction method implemented by a computer processor comprising:

determining by the processor whether one of the fetched instructions is the first taken branch instruction to be predicted according to hint instruction(s) or according to latest statistics of whether respective fetched instructions have been taken;

if one of the fetched instructions is determined to be the first taken branch instruction, performing by the processor branch prediction on the first taken branch instruction; and if none of the fetched instructions is determined to be the first taken branch instruction, and if the fetched instructions comprise a plurality of branch instructions, arbitrarily determining one branch instruction out of the fetched instructions to be the first taken branch instruction and performing by the processor branch prediction on the first taken branch instruction.

23. A branch prediction device, positioned in a processor, capable of predicting a first taken branch instruction within a plurality of fetched instructions, the branch prediction device comprising:

a first taken branch instruction predictor for determining whether one of the fetched instructions is the first taken branch instruction to be predicted according to hint instruction(s) or according to latest statistics of whether respective fetched instructions have been taken; and a single prediction logic module, coupled to the first taken branch instruction predictor, for performing branch prediction on at most one fetched instruction in a same clock cycle, wherein the single prediction logic module has logic circuits included therein;

wherein if the first taken branch instruction predictor determines one of the fetched instructions to be the first taken branch instruction, the single prediction logic module performs branch prediction on the first taken branch instruction; and if none of the fetched instructions is determined to be the first taken branch instruction, and if the fetched instructions comprise only one branch instruction, the first taken branch instruction predictor determines the branch instruction to be the first taken branch instruction.

24. A branch prediction device, positioned in a processor, capable of predicting a first taken branch instruction within a plurality of fetched instructions, the branch prediction device comprising:

a first taken branch instruction predictor for determining whether one of the fetched instructions is the first taken branch instruction to be predicted according to hint instruction(s) or according to latest statistics of whether respective fetched instructions have been taken; and a single prediction logic module, coupled to the first taken branch instruction predictor, for performing branch prediction on at most one fetched instruction in a same clock cycle, wherein the single prediction logic module has logic circuits included therein;

wherein if the first taken branch instruction predictor determines one of the fetched instructions to be the first taken branch instruction, the single prediction logic module performs branch prediction on the first taken branch instruction; and if none of the fetched instructions is determined to be the first taken branch instruction, and if the fetched instructions comprise a plurality of branch instructions, the first taken branch instruction predictor arbitrarily determines one branch instruction out of the fetched instructions to be the first taken branch instruction.

* * * * *